Patented Dec. 4, 1928.

1,693,939

UNITED STATES PATENT OFFICE.

LAWRENCE V. REDMAN, OF CALDWELL, NEW JERSEY, AND HAROLD C. CHEETHAM, OF CHICAGO, ILLINOIS, ASSIGNORS TO BAKELITE CORPORATION, OF NEW YORK, N. Y., A CORPORATION OF DELAWARE.

IMPREGNATING SOLUTION.

No Drawing. Application filed April 24, 1923, Serial No. 634,386. Renewed February 23, 1928.

This invention relates to the impregnation, with synthetic resins of the phenolic type, of a pervious base, which term is employed herein to include not only wood, fibrous compositions whether loose or solid, paper, paper board and other paper or wood products, cement and similar absorptive substances, but all such compositions or structures as are characterized by the presence of internal air spaces, capillary channels and the like, as for example, coils for electrical purposes wound with either insulated or uninsulated wire, etc.; and to solutions applicable to such use. Great difficulties have been experienced in the past in the impregnation of such pervious bodies, especially when these are in compact or solid form, owing principally to the tendency to the formation of bubble cavities within the body or on its surface.

The phenolic resins employed for impregnation are, as is now well understood, condensation products of phenols and such methylene-containing bodies as formaldehyde, hexamethylenetetramine and their equivalents, the condensation or hardening being usually accompanied by some liberation of ammonia derived either from the hexamethylenetetramine, or from ammonia introduced as such for its catalytic or accelerating effect. The impregnating solutions are commonly alcoholic. The formation of bubble cavities may be traced, in most if not all cases, to the following causes: (1) the liberation during the hardening step of air which has been entrapped in the pores or cavities of the body; (2) the vaporization of the alcoholic or other volatile solvent; and (3) the liberation of ammonia as a by-product of the reaction.

According to the present invention, we are enabled to suppress all formation of bubble cavities in impregnating pervious bodies with hardened phenolic condensation products of this type. This we accomplish by substituting for the usual alcoholic or other volatile solvent the aldehydic body furfural. This substance in a state of purity boils at about 161° C. and is practically non-volatile at temperatures sufficiently elevated to permit hardening of the reactive resin. It may remain in the product without injury to the latter, functioning as a so-called solid solvent for the infusible resin and as a liquid solvent for the fusible and potentially reactive resins. By reason of this property the solutions of the potentially reactive resin in furfural may be applied by means of vacuum impregnation, whereby deep impregnation may be secured and the air completely eliminated. This vacuum-impregnation method is not successfully applicable with alcoholic or other volatile solutions, by reason of the bubbling due to the subsequent vaporization of alcohol, as mentioned above. It will thus be seen that the use of furfural as the solvent for the potentially reactive phenolic resin eliminates at once two of the three causes of bubbling noted above, to wit that due to the expansion or liberation of entrapped air, and that due to the vaporization of the solvent.

We have discovered that it also eliminates the third of the above noted causes of bubbling, to wit the liberation of by-product ammonia. We have found that this ammonia reacts in the first instance with furfural to form furfuramid, and that this latter, under the conditions employed for transforming the potentially reactive resin to its infusible state, passes over into the nitrogenous resinous body furfurin, which remains in the mass, as a part of the impregnating material, probably entering into solid solution with the infusible phenolic resin. It is of course necessary that the furfural should be used in sufficient proportion relative to the nitrogen content of the resin to combine with all of the liberated ammonia, that is to say in a minimum proportion of about 20 to 40 parts by weight of furfural per 100 parts of resin. In most solutions suitable for impregnating purposes it is used largely in excess of such proportions.

In carrying out our invention, the potentially reactive phenolic resin composition, comprising for example a fusible phenol resin with which has been incorporated, say, 5–15 percent of a methylene-containing hardening agent, as hexamethylenetetramine, is dissolved in furfural, using such proportions of the solvent as are required to give a solution of the desired concentration and viscosity for the particular purpose in view. For example we may use 20 to 60 parts by weight of furfural per 100 parts of resin, although our invention is not restricted to these proportions. Preferably the object to be impregnated is subjected to vacuum to remove the contained air, and the solution is permitted to impregnate it, either throughout the mass or to the extent desired, as readily controlled by the viscosity of the solution and the time permitted for the impregnation. The impregnated object is then, either with or without further shaping, heated to a sufficient temperature, say 125°–150°, until the transformation of the potentially reactive resin composition to its infusible state is accomplished. This heating may be conducted without counter pressure when the temperature is kept substantially below the boiling point of the furfural, or higher temperatures, with more rapid transformation, may be used with appropriate counter pressure, for example in a closed vessel charged with air, steam or neutral gas under pressure; or alternatively in a heated press, especially where some shaping, embossing, or similar effect is desired.

As will be understood by those familiar with this art, the expression "potentially reactive resin" is used to designate all such resins or resin-containing compositions as are initially soluble and fusible, but become infusible by application of sufficient heat, in contradistinction to the non-reactive resins, which remain soluble and fusible under application of heat. As is well understood by those familiar with this art, the potentially reactive character is imparted to the non-reactive phenolic resins by the incorporation therewith of a sufficient proportion of a hardening agent containing methylene groups.

We claim:

1. An impregnating solution comprising a potentially reactive phenolic resin capable of setting free ammonia during its transformation to the infusible state, and furfural in proportion at least sufficient to combine with the liberated ammonia.

2. An impregnating solution comprising a potentially reactive phenolic resin capable of setting free ammonia during its transformation to the infusible state, and furfural in substantial excess of the proportion required to combine with the liberated ammonia.

In testimony whereof, we affix our signatures.

LAWRENCE V. REDMAN.
HAROLD C. CHEETHAM.